United States Patent [19]

Bescherer

[11] 4,318,364
[45] Mar. 9, 1982

[54] BIRD FEEDING DEVICE

[76] Inventor: Robert E. Bescherer, P.O. Box 23, Bristol, R.I. 02809

[21] Appl. No.: 190,426

[22] Filed: Sep. 24, 1980

[51] Int. Cl.³ .............................................. A01K 39/01
[52] U.S. Cl. ................................................. 119/51 R
[58] Field of Search ..................... 119/51 R, 52 R, 53

[56] References Cited

U.S. PATENT DOCUMENTS

| 1,131,491 | 3/1915 | Drake | 119/53 |
| 2,705,938 | 4/1955 | Greenough | 119/52 R |
| 2,961,695 | 11/1960 | Fradd | 119/52 R X |
| 3,089,461 | 5/1963 | Dunn | 119/51 R |
| 3,094,973 | 6/1963 | Devall | 119/51 R X |
| 3,515,098 | 6/1970 | Thurmond | 119/51 R |
| 3,568,641 | 3/1971 | Kilham | 119/51 R |

Primary Examiner—Gene Mancene
Assistant Examiner—Robert P. Swiatek
Attorney, Agent, or Firm—Barlow & Barlow

[57] ABSTRACT

A bird feeding device is disclosed and more particularly a bird feeding device in which two varieties of granulated bird feed may be dispensed in a single device. The bird feeder includes a pair of transparent side wall sections having feeding ports therein that are joined to a central partition member, the ends of the device being closed by a bottom wall, and a moveable top cover. Perches are provided adjacent to the feeding ports, the perches serving additionally as means to secure the side walls to the central partition.

3 Claims, 5 Drawing Figures

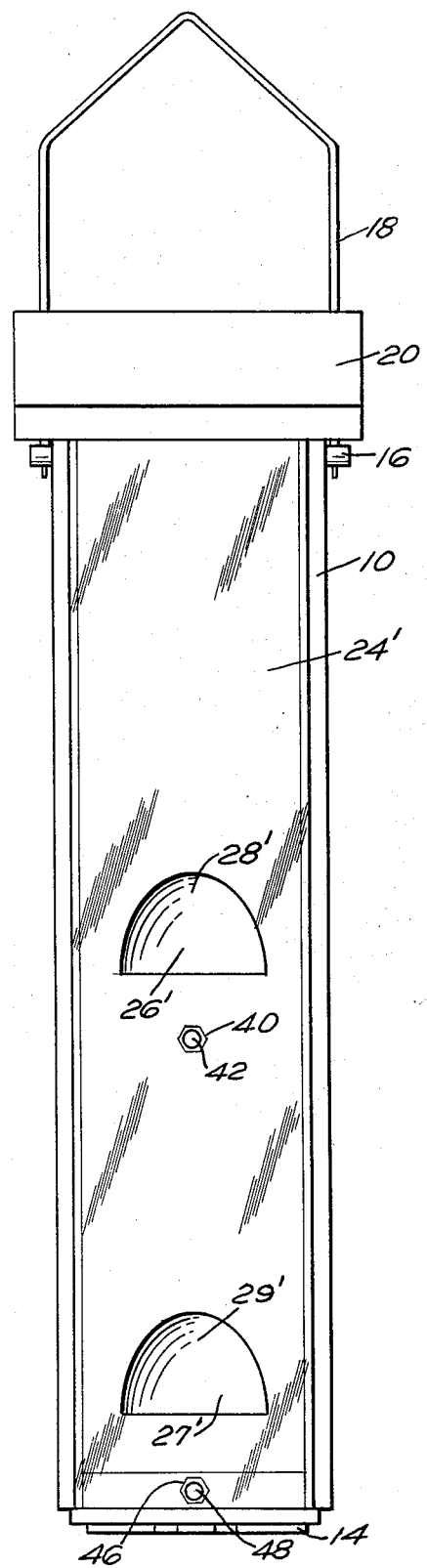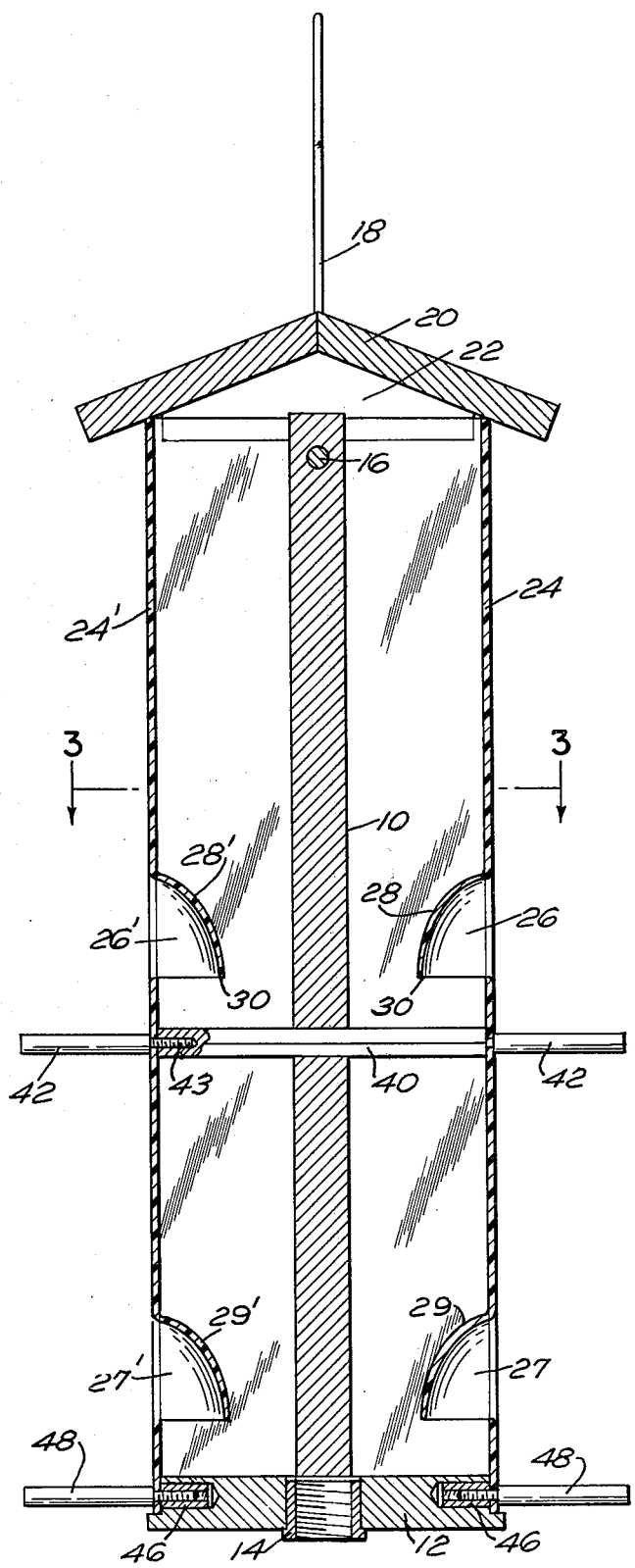
FIG. 1
FIG. 2

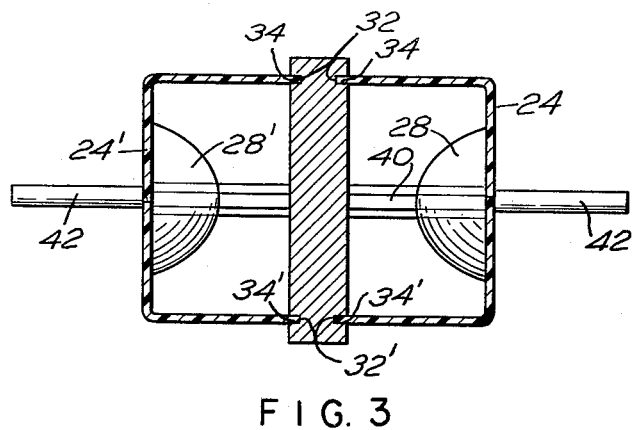
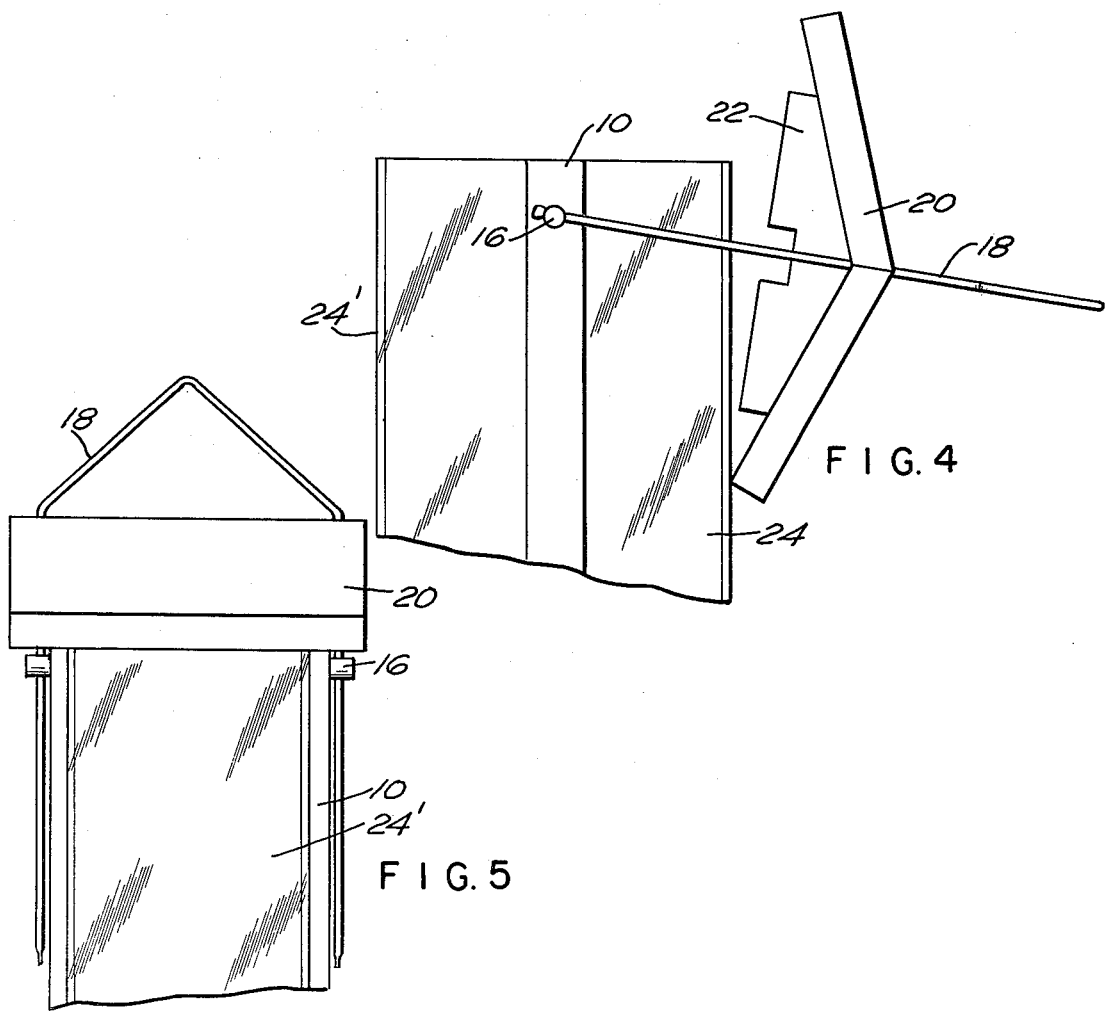

BIRD FEEDING DEVICE

BACKGROUND OF THE INVENTION

There is described in the prior art a number of forms of bird feeders. One of the more popular forms of bird feeders is a vertically disposed device with transparent walls where the level of the seed therein can be readily viewed. A tubular transparent feeder as seen in U.S. Pat. No. 3,568,641 which while it may be disassembled, is more difficult to clean than one which has all of its surfaces readily accessible. There is a need in the art for a device which can be readily cleaned and which is easily assembled. Also it is advantageous in some areas of the country to have different types of seeds that may be made available to the birds. In this latter regard, while it has broadly been known to provide feeding devices with compartments as seen for example in the Steller U.S. Pat. No. 45,190 and in the Viggars U.S. Pat. No. 3,316,884, some of these prior art feeders are not easily cleaned and assembled and are more complicated and expensive to produce.

SUMMARY OF THE INVENTION

The principal objective of this invention is to provide a bird feeding device which may be formed from two transparent side wall sections that may be formed as U-channels, the side wall sections being attached to a center support or partition member, which may be made from a variety of materials, such as aluminum, plastic or wood. A bottom wall may be readily attached to the partition member, and a removeable cover or roof completes the enclosure. Feeding ports in the form of side openings may be readily molded or otherwise formed in the side walls to form a combination feed opening and baffle, and the side walls may be readily joined to the center partition by a post that is attached to the center partition and extends outwardly therefrom to hold the inner face of the side walls in a fixed position, perches being screwed into the post that serve to fasten the side walls to the center partition.

An object of the instant invention is to provide an integral bird feeding device which may be readily assembled and disassembled and which has two separate compartments that allow the feeding of different kinds of bird feed at the same time. A further object of the invention is to mold the feeding ports so that baffles are formed and a still further object is to form side wall sections of a rectangular shape which will give greater capacity for the same overall size. A still further object of the invention is the provision of a bird feeding device which is light in weight and easy to clean.

BRIEF DESCRIPTION OF THE DRAWINGS

FIG. 1 is a front elevational view of a bird feeding device of the invention in assembled form;

FIG. 2 is a sectional view of the device;

FIG. 3 is a sectional view taken on lines 3—3 of FIG. 2;

FIG. 4 is a partial view of the top portion of the bird feeding device with the cover or roof removed for filling; and FIG. 5 is a partial view of the top portion of the feeder showing the hanging bail collapsed.

DESCRIPTION OF THE PREFERRED EMBODIMENT

As can be seen in the drawings, the bird feeding device of the invention comprises a central partition or support 10 which rises vertically from a bottom wall 12. The bottom wall 12 may be attached to the partition 10 by fastening means (not shown) and may be provided with a central threaded insert 14 to receive a post so that the feeding device may be supported above the ground. At the upper portion of the partition 10 there is a post 16 extending thereacross which post has a pair of apertures adjacent its outer end that receive a bail 18. The bail 18 has its free ends enlarged and supports a top or roof 20 which may be a gable roof as shown with gables 22. The bail 18 extends through apertures in the roof, the roof being adapted to slide on the bail 18 for purposes which will be presently described.

As seen more particularly in FIG. 3, a pair of vertical elongated side walls 24, 24' extend on either side of the center partition 10. The side walls are illustrated as being U-shaped in cross section, and, in spaced locations along their extent, feeding ports 26, 26', 27, 27' are formed with integral baffle means 28, 28', 29, 29' respectively. The baffle means extend inside the walls in such a way that the bird seed is prevented from flowing out of the feeding ports 26, 26' and 27, 27', the bird seed gravitating around the baffles 28, 28', 29, 29' so the level of the bird seed will be automatically maintained at the bottom edge of each baffle as for example at 30. The side walls have longitudinal edges as for example the edges 32, 32' in side wall 24, and these edges are received in grooves 34, 34' in the partition 10.

In order to hold the side walls to the center partition, a post 40 extends from the center partition outwardly to the inner face of the side walls 24, 24'. The outer ends of the post 40 are threaded as seen in FIG. 2 and are adapted to receive a perch 42 that has a reduced threaded end 43 that extends into the threaded bore in the post 40. The reduced end provides a shoulder engaging the side wall to hold it to the support 10. The bottom wall 12 is also formed with a threaded bore as at 46 which also receives a shouldered threaded end of a perch 48, and in this manner the side walls are firmly secured, forming an integral structure.

For filling the feeder with seed, the roof 20 may be raised on the bail 18 and tilted sideways as seen in FIG. 4 of the drawings, thus leaving wide open the upper end of the side walls and with complete access to the interior. When the feeding device is mounted on a post by a post engaging the insert 14, the bail member 18 may be depressed and slid down through the apertures in the rod 16 as seen in FIG. 5, thus holding the roof in position against being dislodged by animals or wind and the elements.

It will be apparent that the bird feeding device of this invention may be readily disassembled by removing the perch posts 42, 48, and the side walls may be completely detached for easy cleaning. The side walls are preferably made from a clear plastic, and may be easily placed within washing devices for full cleaning and removal of any caked bird seed and the like that would accumulate by the entry of a small amount of water into the feeding device.

It will be apparent that the entire assembly is readily constructed from two identical side wall portions, a center partition, a roof, and a bottom wall with mounting hardware, and the cost of this device is extremely small. The center partition may be made from wood or metal while the perches and the fastening hardware may be either metal or plastic.

I claim:

1. A bird feeding device comprising a supporting bottom wall of substantial area surrounded by peripheral edges, means providing a support for said bottom wall, an elongated vertical partition fixed to the bottom wall and rising therefrom intermediate the edges of the bottom wall, a pair of vertically elongated side walls of generally U-shaped cross section having their lower ends engaging said bottom wall and their longitudinal edges directed toward each other and engaging the partition whereby a compartment is provided by each side wall separated by said partition, a plurality of feeding ports in the side walls, means to secure the side walls to said partition and means to cover the upper end of said compartments.

2. A bird feeding device as in claim 1, said means to secure the side walls comprising a post extending from said partition and a fastener passing through the side walls engaging the post.

3. A bird feeding device as in claim 1, the cover means being a top wall, a bail extending from the partition, said bail passing through said top wall to hold the top wall in position and allow the top wall to be slid upwardly on the bail for access to the compartments.

* * * * *